United States Patent [19]

Otani

[11] 4,351,868
[45] Sep. 28, 1982

[54] MOLDING
[75] Inventor: Takashi Otani, Nagoya, Japan
[73] Assignee: Toyoda Gosei Co., Ltd., Aichi, Japan
[21] Appl. No.: 254,267
[22] Filed: Apr. 15, 1981
[51] Int. Cl.³ .............................................. B32B 3/12
[52] U.S. Cl. .................................... 428/120; 49/460; 293/1; 428/31; 428/188
[58] Field of Search .......................... 49/460, 462–498; 428/72, 119, 120, 178, 188; 293/1–128

[56] References Cited

U.S. PATENT DOCUMENTS

| | | | |
|---|---|---|---|
| 2,065,450 | 12/1936 | Gordon | 428/72 |
| 3,205,891 | 9/1965 | Achner | 428/188 X |
| 3,251,076 | 5/1966 | Burke | 428/119 X |
| 3,495,628 | 2/1970 | Boender | 428/178 X |
| 3,606,431 | 9/1971 | Kunevicius | 428/31 X |

FOREIGN PATENT DOCUMENTS

| | | | |
|---|---|---|---|
| 53-45838 | 11/1978 | Japan | 428/31 |
| 53-149317 | 11/1978 | Japan | 428/31 |
| 1364002 | 8/1974 | United Kingdom | 428/31 |

Primary Examiner—Henry F. Epstein
Attorney, Agent, or Firm—Leitner, Palan, Martin & Bernstein

[57] ABSTRACT

Molding made of high polymer material, formed as a hollow molding body from extrusion and installed to a substance through adhesive means on a rear surface of the molding body, characterized in that plural pieces of a projecting pillar are arranged to be projecting from an upper wall and a bottom wall of a hollow portion of the body in the longitudinal direction. When installing the molding to a substance, pressing force applied to the molding body is almost equally transmitted to the whole bottom surface of the body.

The molding can restore adhesive force declined with the passage of time to the original state by applying pressing force from the molding surface even after installing to the substance as well as can perform adhesive function of the adhesive layer sufficiently.

5 Claims, 4 Drawing Figures

MOLDING

BACKGROUND OF THE INVENTION

The present invention relates to a decorative and protective molding for automobiles, buildings furnishings and the like, in which when a substance to which the molding is installed contacts with the other object, the substance protects not only for itself but also for the other object. More especially, the invention relates to a decorative and protective molding of larger size having a hollow portion formed from extrusion of high polymer material.

The molding of this kind is popularly used for furnishings, automobiles and the like. Especially the molding represented by side molding applied for automobiles is now mostly formed from plastics. And, it is a tendeney that the molding of larger size increases in recent years viewing from designing needs, safety and the like. Following the use of larger size molding, hollow molding is becoming popular in view of weight, cost and feel.

For installation of plastic molding such as side molding and the like to the body of automobiles, double-coated adhesive tape is generally used in place of applying screws, clips and the like to the body after boring necessary holes therein when molding was made of metal. That is, previously one surface of double-coated adhesive tape is bonded on the rear surface of molding and another surface is covered with protective paper.

And when installing molding to a substance to be applied, the protective paper is peeled off from the tape and the adhesive surface is pushed against the substance and bonded thereon.

In the molding using sensitive adhesive such as double-coated adhesive tape, since the adhesive force between molding and the substance applied results in decrease with the increase of weight corresponding to larger size of molding, it is necessary to keep up adhesive force as well as to prevent the increase of weight by producing molding body made to be hollow. Otherwise, a sensitive adhesive agent having stronger adhesiveness must be developed, or decrease of adhesive force must be prevented by using double-coated adhesive tape together with the other stronger adhesive.

In addition to decrease in adhesive force, the use of larger size molding results in increase of material and weight and, when applying to automobiles, increase in weight is not desirable from the standpoint of saving resources and energy. Coping with these bottlenecks, hollow type molding has been adopted especially in larger size molding.

In case of hollow type molding, if the solidity of material is below 80 degree in accordance with Japanese Industrial Standard, JIS K 6301 (herein after same) the adhesive layer comprising sensitive adhesive constituted in the bottom surface of molding body can desirably be bonded on the substance by pushing pressure from the surface of molding body. However, such soft molding is not sufficient for keeping up shape as well as for performing protective effect and molding itself is also susceptible to damage.

Moreover, there is a problem awaiting solution in thermal and standing stability, so that such material is not put to practical use as molding for automobiles.

Generally, molding having solidity ranging from 85 to 97 degree is used as side molding for automobiles. The material of these molding is formed from extrusion of high polymer material represented by vinyl chloride resin, thermoplastic urethane and the like. Above mentioned adhesive layer is constituted on the rear surface of the molding body after extruding the body.

When installing larger size hollow molding comprising such soft or somewhat hard material to the substance to be applied, pushing force is not equally transmitted to the whole bottom surface and there is a part where pushing force is hardly transmitted to the center of bottom surface although pushing force is sufficiently transmitted to the bottom along the side wall. In any case, adhesive force of the adhesive layer is large in both end portions having side walls against the cross section of molding body and smaller as making for the center (inside). Therefore, adhesive force is not sufficient as a whole. As a result, when installing this larger size hollow molding to the body of automobiles as side molding, the molding is not firmly bonded on the body of automobiles and there has been a possibility that the molding peels off at the end portion, or molding falls off due to expansion and contraction of molding with the difference of temperatures between day and night or between summer and winter and due to shock or the like during traveling.

SUMMARY OF THE INVENTION

An object of the present invention is to provide a hollow molding suitable for decorative and protective use of larger size in which when installing hollow molding to a substance to be applied, pushing force applied to the molding body is almost equally transmitted to the whole surface of molding and the adhesive force of the adhesive layer constituted on the rear surface of molding, can almost equally be attained to perform the adhesive function of adhesive layer sufficiently and that lightening of molding itself, saving of material and protective effect of buffering and the like are hardly retarded comparing with those of conventional hollow molding.

Another object of the present invention is to provide a hollow molding in which even after installing molding to the substance when the adhesive force decreases with the passage of time due to dead load of molding or expansion and contraction or shock and the like, it makes possible reinforce thereof and increase adhesive force as strong as the original state by applying pushing force from the surface of molding.

Above mentioned objects can be attained by suitably projecting plural pieces of a projecting pillar from the upper wall and the bottom wall of the hollow portion of the molding body in the longitudinal direction.

DESCRIPTION OF THE PREFERRED EMBODIMENTS

According to drawings several embodiments of the invention will be described in the following.

Figure 1:
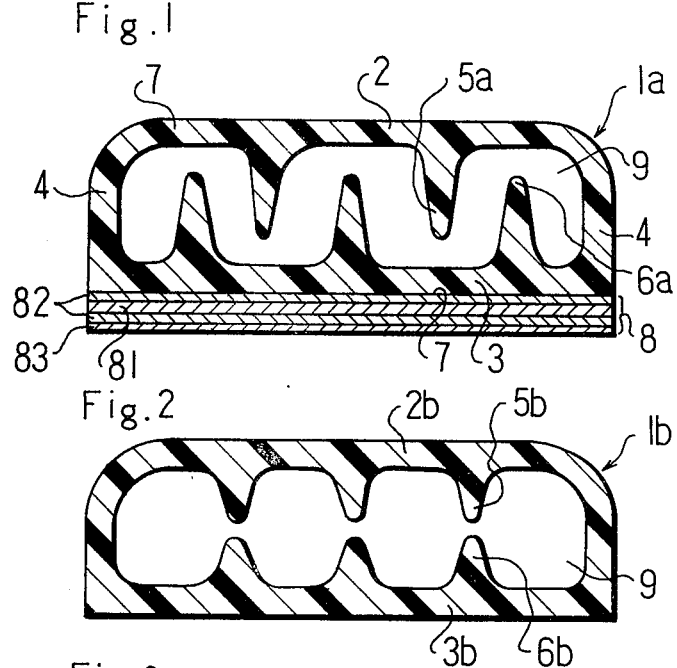
FIG. 1 is a sectional view of a molding as the first embodiment of this invention.

FIG. 1 shows the first embodiment of this invention, in which a hollow molding 1a encloses a hollow portion 9 with an upper wall 2, a bottom wall 3, and a side wall 4, 4. On respective inside walls of the upper wall 2 and the bottom wall 3, plural pieces of a projecting pillar 5a and 6a are arranged in the longitudinal direction.

The projecting pillar on one side, e.g. the projecting pillar 5a on the upper wall 2 is arranged between projecting pillars on the other side, in this case, the projecting pillar 6a and 6a, i.e. a valley portion 7.

Numeral 8 is a double-coated sensitive adhesive tape bonded on the bottom of the hollow molding 1a and a viscous adhesive 82 is coated on both surfaces of a base 81 (Mostly rubber base): one surface is bonded on the bottom wall 3 of the hollow molding 1a and the other surface is covered with a protective paper 83. When bonding on a substance, the molding is pushed against the substance after peeling off the protective paper 83.

As the plastic material of molding, high polymer material of solidity ranging from 85 to 97 degree such as vinyl chloride resin, acetic butylic acid cellulose resin, ABS resin, thermoplastic urethane is desirably used. Vinyl chloride resin is now most generally used from the point of plasticity and cost. In this case, if it makes material slightly foam by combining foaming agent, it contributes to improvement of feel and buffering and to reduction of weight and material due to declining of density.

Regarding solidity, aforementioned range is only shown as desirable range in applying to the side molding for automobiles. Therefore, soft solidity below aforementioned range may as well be used as hard solidity above aforementioned range. Regarding material, it should suitably be selected according to use (a portion to be applied) and should not be limited to this range whatever.

And, regarding plastic material of molding, so with the following second to fourth embodiments.

Figure 2:
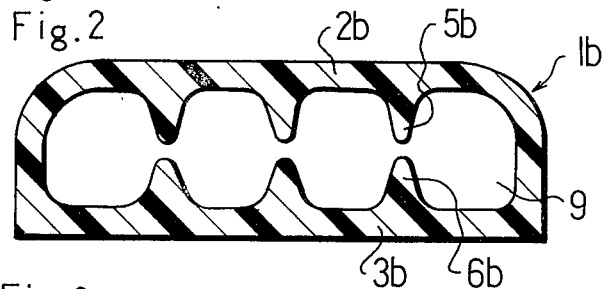
FIG. 2 is a sectional view of a molding as second embodiment of this invention.

FIG. 2 shows second embodiment of this invention, in which a molding comprises an upper wall 2b and a bottom wall 3b, and a projecting pillar 5b and 6b projecting from these walls towards a hollow portion 9 is oppositely arranged with each other and the top of each projecting pillar 5b and 6b is adjacent to each other. And in embodiments other than the first embodiment, only the molding is shown and double-coated adhesive tape is omitted.

And, bonding of the molding of this invention on a substance is not necessarily limited to sensitive adhesive tape but also applicable to adhesive of various kinds.

Figure 3:
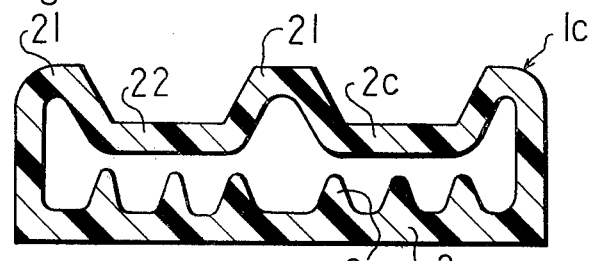
FIG. 3 is a sectional view of a molding as third embodiment of this invention.

FIG. 3 shows third embodiment of this invention, in which a molding is constituted as a shape having a convex portion 21 and a concave portion 22 by a decorative design on the surface of an upper wall 2c.

On a bottom wall 3c, plural pieces of a projecting pillar 6 are arranged on spots corresponding to the concave portion 22 of the upper wall 2c.

Figure 4:
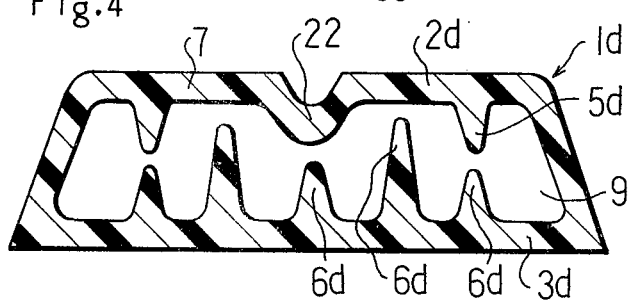
FIG. 4 is a sectional view of a molding as fourth embodiment of this invention.

FIG. 4 shows fourth embodiment of this invention, in which a molding 1d has a decorative concave 22 at the center of an upper wall 2d. A projecting pillar 5d and 6d projecting from the upper wall 2d and a bottom wall 3d towards a hollow portion 9 is different in size and shape, and some projecting pillars 6d projecting from one side, e.g. the bottom wall 3d are adjacent to the other side, in this case, a valley 7 of the upper wall 2d and some are adjacent to projecting pillars 5d. That is, the projecting condition of projecting pillars projecting from one side towards the other side is interspersedly arranged as above mentioned.

Next, use state of each above mentioned embodiment of this invention will be described. When installing the molding to a substance, e.g. the side wall of car body, taking the molding of the first embodiment (FIG. 1), peel off the protective paper 83 of the adhesive tape 8, adhesive layer of the molding 1a, locate a given spot, push the surface of the upper wall 2 of the molding 1a, and the adhesive surface of the adhesive tape 8 adheres to the substance. This time, by pushing the surface of the upper wall 2 of the molding 1a, the projecting pillar 5a communicates with the valley portion 7 of the bottom wall 3 and pushes the portion and at the same time, the projecting pillar 6a of the bottom wall 3 also pushes the valley 7 of the upper wall 2, and the pushing force from the surface of the molding 1a is dispersedly and almost equally applied to the whole surface of the bottom wall 3 by the side wall 4 of the molding 1a and plural pieces of the projecting pillar 5a and 6a with which the upper wall and the bottom wall are communicated by pushing force.

Therefore, the molding can be bonded on the substance by making the best use of the adhesive force of the adhesive layer constituted with the adhesive tape 8 and the adhesive force in the center of the bottom wall of the hollow molding is not declined as before.

The molding of second, third and fourth embodiments presents the same function as aforementioned.

And, although the projecting pillar on one side is constituted to be adjacent to the projecting pillar on the other side or to the valley portion in aforementioned embodiment, this may have them communicate with from the first.

Moreover, in a case of the inner surface of the upper wall or bottom wall being flat and providing that the number of the projecting pillar on one side is set "n", "n" or "n−1" (even "n+1" is practically the same) is desirably set as that of the other side. However, according to the shape of the upper wall or bottom wall, the number of the projecting pillar on the other side can optionally be selected (e.g. FIG. 3) as far as "n−n".

What is claimed is:

1. Molding made of high polymer material, formed as a hollow molding body from extrusion for installation on a substance by adhesive means on a rear surface of said molding body, characterized in that plural pieces of a projecting pillar are arranged to be projecting from an upper wall and a bottom wall of a hollow portion of said molding body in the longitudinal direction, each of said pillars being of insufficient length to communicate with said opposed wall and pillar to define a continuous transverse hollow portion when said molding is free from a pushing force applied to said molding, and each of said pillars being sufficiently long to make contact with opposed wall and pillar when a pushing force is applied to said molding to substantially evenly apply said force to said adhesive.

2. Molding according to claim 1, characterized in that each of the top parts of plural pieces of the projecting pillar projecting from the upper wall and the bottom wall of the hollow portion of the molding body in the longitudinal direction on one side is constituted to be in a valley portion between the projecting pillars on the other side.

3. Molding according to claim 1, characterized in that plural pieces of the projecting pillar projecting from the upper wall and the bottom wall of the hollow portion of the molding body in the longitudinal direction are oppositely arranged from both sides and each top of the projecting pillars is constituted to be adjacent to or communicating with each other.

4. Molding according to claims 1, 2 or 3, characterized in that providing the number of plural pieces of the projecting pillar projecting from the upper wall and the bottom wall of the hollow portion of the molding body in the longitudinal direction on one side is set "n", that of the projecting pillar on the other side shall be "n" or "n−1".

5. Molding according to claim 2, characterized in that each of the top ends of plural pieces of the projecting pillar projecting from the upper wall and the bottom wall of the hollow portion of the molding body in the longitudinal direction on one side is arranged to be adjacent to or communicating with that of the projecting pillar on the other side or the inside wall thereof.

* * * * *